Feb. 26, 1929.                                                1,703,335
F. A. BOWER
LUBRICATING AND FILTERING SYSTEM
Filed June 18, 1925    2 Sheets-Sheet 2

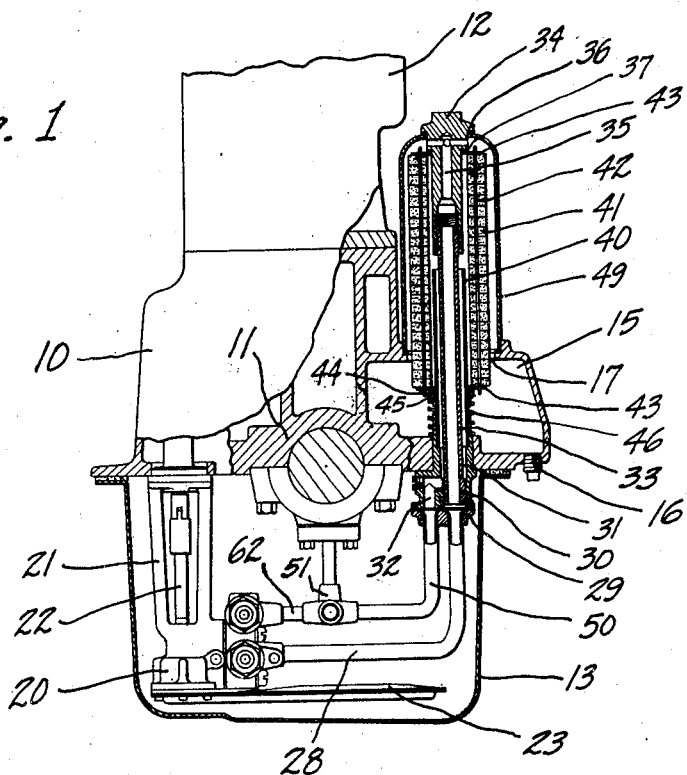

INVENTOR
FERDINAND A. BOWER
BY
ATTORNEYS

Patented Feb. 26, 1929.

1,703,335

UNITED STATES PATENT OFFICE.

FERDINAND A. BOWER, OF FLINT, MICHIGAN, ASSIGNOR TO GENERAL MOTORS CORPORATION, OF DETROIT, MICHIGAN, A CORPORATION OF DELAWARE.

LUBRICATING AND FILTERING SYSTEM.

Application filed June 18, 1925. Serial No. 37,968.

The present invention relates to lubrication systems for internal combustion engines, particularly engines of automobiles.

Among the objects of the invention is to provide means for preventing contamination of the oil in such engines by dirt, metal particles, etc. Another object is to provide a filter for the oil being circulated in the oiling system of such engines.

Still another object is the provision of means whereby the bearings will be supplied with oil under all operating conditions, irrespective of the operation of the filter.

Figure 3:
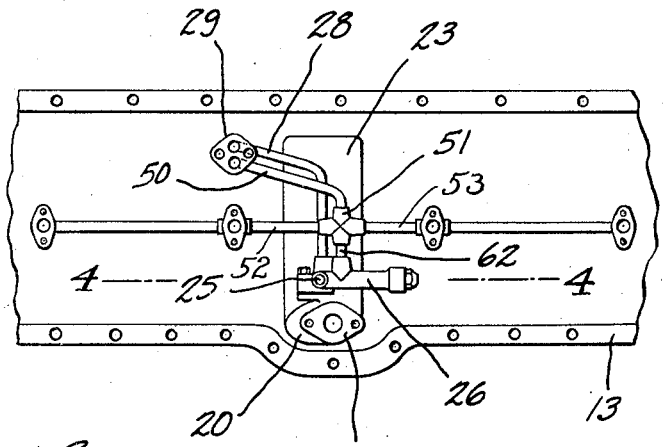
Figure 4:
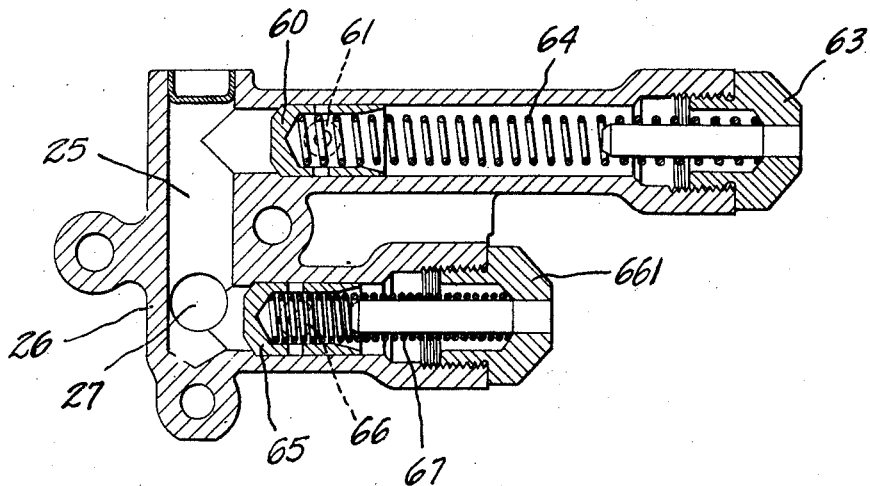

The invention is best illustrated and described with reference to the accompanying drawings in which:

Fig. 1 is a vertical cross section through the engine and filter with parts in elevation, Fig. 2 is a side elevation of the oil distribution system supplied directly by the pump, Fig. 3 is a plan view of the parts shown in Fig. 2, Fig. 4 is a vertical longitudinal section through the double valve on line 4—4 of Fig. 3.

In the drawings, the crank case, usually a casting, is shown at 10. This is provided with the usual housings for the main crank shaft bearings at 11 and has bolted, or otherwise secured, to it, the cylinders 12 and to its underside the oil pan 13.

Formed as a part of the crank case 10 and intermediate its length is an oil chamber 15 having an opening 17 in its upper side and provided with a plugged opening 16 in its bottom.

The oil circulation system comprises pump 20 carried by a frame 21 secured to the crank case 10 and driven by shaft 22. The pump 20 draws oil from the lower portion of pan 13 through a screen 23 and delivers it to the header 25 of a combination valve member 26 (shown in section in Fig. 4). In normal operation, the oil then passes out through opening 27 into pipe 28 which is connected thereto and which is at its other end connected to a flange 29. The latter is secured to a fitting 30 which is in turn secured to the underside of the oil chamber 15 and projects into the same, as shown in Fig. 1.

Fitting 30 is provided with a passage 31 in line with pipe 28 which passage is threaded at its lower end and is somewhat larger above the threaded portion. Fitting 30 is also provided with another passage 32 leading from passage 31 above the threaded portion to the bottom and adapted to register with another pipe as shown.

Secured in the threaded portion of passage 31 is a tube 33 forming a continuation of pipe 28 and extending through chamber 15 and the opening 17 to a point somewhat above the latter. This tube 33 is threaded at its upper end to cooperate with a member 34 which has a passage 35 continuing the oil inlet tube 28 and 33. Near its upper end member 34 is provided with two shoulders 36 and 37, one above the other and between which passage 35 opens to the outside of the member. A second tube 40 fits into the upper end of passage 31 in fitting 30 and surrounds tube 33 being spaced therefrom. This tube extends to a point a little below the upper end of tube 33 and is open at the top.

Extending down through the opening 17 in the chamber 15 and over the tubes 33 and 40 is a tubular filter unit 41. This unit has an outside diameter somewhat smaller than the diameter of opening 17 and an inside diameter somewhat larger than the outside diameter of tube 40. It is, in the form shown, made up of a "stack" of felt washers held together by longitudinal wires 42 passing through the felts and through metal plates or washers 43 at the ends.

At its top, the filter unit 41 abuts shoulder 37 of member 34 while at the bottom the unit rests upon a felt packing 44 closely surrounding tube 40 and carried by a collar 45 which is supported by a spring 46 surrounding tube 40 and the upper end of fitting 30 and resting upon the floor of chamber 15.

Over the filter unit is a cover dome 49 which seats in opening 17 of the chamber 15 and is held under second shoulder 36 on member 34. This arrangement of filter, chamber tubes and so forth provides a passage 28, 33, 35 up through and to the top of the filter unit and to the outside thereof into the space between the unit and the cover. This space opens into chamber 15 in which during operation is a body of oil comparatively quiescent and forms therefor a settling chamber. Further the arrangement of parts forms inside of the filter unit a space for oil passing through the filter from outside thereof and from this space oil is led out through pipe 40, fitting 30, passage 32 to a pipe 50.

The pipe 50 leads to a 4-way connection 51 and oil coming out of the filter will pass therethrough to pipes 52 and 53 and from thence be distributed to the several bearings. In very cold weather when the oil becomes of too great consistency to flow through the filter, or, when, after long continued use, the filter becomes too much clogged to allow passage of the oil, means must be provided whereby oil may be supplied to the bearings without having to pass the filter.

Such means, as shown in the drawings, comprises a spring pressed valve 60 controlling communication between header 25 and opening 61 which latter leads into pipe 62 which in turn leads to the 4-way connection 51. This permits by-passing the filter when the back pressure therethrough exceeds a predetermined value. Further, under conditions of high pump speed and back pressure from the filter, the oil cannot find a way out through the bearings, and it becomes desirable to relieve the oil pressure in header 25. This is done by another spring pressed valve 65 controlling opening 66 which allows the oil to spill back into the oil pan.

It will be noted that the two valves 60 and 65 are substantially identical and that the plugs 63 and 661 serving as spring retainers are also identical. It should also be noted that springs 64 and 67 are identical and that the tension upon them differs because of the difference in length of the respective spring housings. This difference in pressure required for valve opening is important as, under ordinary conditions the valves should both stay closed and the oil all pass through the filter. Under other conditions, valve 60 should open before valve 65.

The operation of the device is more or less obvious, but one or two points should be noted.

The oil passing inwardly through the filter leaves the dirt etc., upon the outside wall from which at least some will drop down into chamber 15 from which it may be flushed through plugged opening 16.

Another point is the spring pressed support for the filter unit. This permits use of felts of somewhat different characteristics. Some felts will compact under use more than others. Some will regain their original volume after cleaning while others will not. The mounting is intended to take care of such differences.

Other points of novelty and advantage will readily occur to those skilled in the art.

Claims:

1. In an oil filtering system for internal combustion engines, having a tubular filter unit into which projects a fluid outlet tube, a support for one end of the unit, said support comprising a collar surrounding said tube, packing between the collar and the adjacent end of the filter unit and a spring around said tube and tending to press the collar and packing against the end of the unit.

2. In an oil filtering system, a tubular filter unit, a fitting serving as a support for said unit having an inlet and an outlet opening, a pipe fitted to said inlet opening, a cover for said unit, means engaging said inlet pipe to retain said cover, and an outlet pipe concentric with said inlet pipe extending into said unit and communicating with said outlet opening.

3. In an oil filtering system for internal combustion engines, the combination with the engine housing having an oil reservoir and a settling chamber, a filter unit having its inlet side communicating with said chamber, a fitting for supporting said filter unit secured in the wall of said chamber, means for supplying oil from said reservoir to said chamber, and means extending through said fitting for delivering oil from the outlet side of said filter, said supplying and delivering means being supported by said fitting.

In testimony whereof I affix my signature.

FERDINAND A. BOWER.

CERTIFICATE OF CORRECTION.

Patent No. 1,703,335.  Granted February 26, 1929, to

FERDINAND A. BOWER.

It is hereby certified that error appears in the printed specification of the above numbered patent requiring correction as follows: Page 2, strike out lines 57 to 66, comprising claim 1, and after line 56, insert instead the following as claim 1:-

1. In an oil filtering system for internal combustion engines, a tubular filter unit, a fitting serving as a support for said unit provided with an inlet and an outlet opening and with an enlarged passage communicating with said openings, an inlet pipe fitted to said inlet opening and extending through said passage, a second pipe concentric with said inlet pipe in said passage, the space between said pipes communicating with said outlet opening, said inlet pipe communicating with the outer side of said unit and said second pipe with the inner side.;

and that the said Letters Patent should be read with this correction therein that the same may conform to the record of the case in the Patent Office.

Signed and sealed this 9th day of April, A. D. 1929.

(Seal)

M. J. Moore,
Acting Commissioner of Patents.